United States Patent [19]

Ihms

[11] Patent Number: 5,089,748
[45] Date of Patent: Feb. 18, 1992

[54] PHOTO-FEEDBACK DRIVE SYSTEM

[75] Inventor: David W. Ihms, Russiaville, Ind.

[73] Assignee: Delco Electronics Corporation, Kokomo, Ind.

[21] Appl. No.: 537,969

[22] Filed: Jun. 13, 1990

[51] Int. Cl.⁵ .............................................. H05B 37/02
[52] U.S. Cl. ...................................... 315/151; 315/158; 315/156; 250/205
[58] Field of Search ............... 315/151, 158, 156, 307, 315/224; 250/205

[56] References Cited

U.S. PATENT DOCUMENTS

| | | | |
|---|---|---|---|
| 4,135,116 | 1/1979 | Smith | 315/158 |
| 4,417,179 | 11/1988 | Fujimura et al. | 315/158 X |
| 4,443,741 | 4/1984 | Tanaka et al. | 315/307 |
| 4,463,284 | 7/1984 | Tamura et al. | 315/158 |
| 4,467,246 | 8/1984 | Tanaka et al. | 315/158 |
| 4,595,861 | 6/1986 | Simopoulos et al. | 315/169.3 |
| 4,611,150 | 9/1986 | Ball et al. | 315/307 |
| 4,633,141 | 12/1986 | Weber | 315/307 |
| 4,684,822 | 8/1987 | Angott | 315/158 X |
| 4,717,863 | 1/1988 | Zeiler | 315/307 |
| 4,845,489 | 7/1989 | Hormel | 340/811 |

Primary Examiner—Eugene R. Laroche
Assistant Examiner—Do Hyun Yoo
Attorney, Agent, or Firm—Mark A. Navarre

[57] ABSTRACT

A driver circuit for an electroluminescent lamp has a photo-diode for detecting the light intensity of the electroluminescent lamp and providing an output signal responsive to the intensity of the lamp and a circuit responsive to the output signal for driving the electroluminescent lamp at a set intensity.

1 Claim, 2 Drawing Sheets

PHOTO-FEEDBACK DRIVE SYSTEM

A drive circuit for an electroluminescent lamp maintains the lamp at a constant intensity using photo-feedback.

BACKGROUND OF THE INVENTION

Electroluminescent (EL) panels provide an alternative to incandescent lighting in many applications, such as automotive or aircraft instrument panels. Uniform light generation without color shift, compact size, and low heat output make EL panels ideal for such applications.

There are, however, inherent characteristics of EL panels and conventional drive systems that limit their desirability in these applications. Most significantly, as a typical EL panel is driven at a constant voltage for a period of time, the light intensity output decreases, resulting in a short panel life span. Additionally, under constant drive conditions, as temperature changes, the panel intensity varies. Humidity and ambient temperature affect panel life. Also, the turn-on intensity is higher than the turn-off intensity. Present inverter-panel lighting systems must be designed to allow excessively high intensity levels at the beginning of lamp operation to guarantee sufficient intensity to the end of operation time target.

Previous inverter driver circuits have tried to compensate for intensity changes by using indirect methods. These methods utilize the decrease in panel capacitance, which occurs as the panel ages. The most common technique is to design the inverter-panel system to increase the drive voltage and frequency as the lamp capacitance decreases. This is achieved by designing the drive-panel system as a tuned LCR oscillator. However, this indirect method does not provide sufficient control for maintaining light output levels.

SUMMARY OF THE PRESENT INVENTION

The present invention provides a direct method to control the light intensity of an EL panel. The invention is an improved circuit for supplying power to an inverter-panel lighting system which offers absolute control of the light intensity as the lamp ages or is operated under changing temperature conditions.

The invention specifies an electrical circuit that has a means for detecting the light intensity of the EL panel and in turn provides an output drive voltage for an inverter-panel lighting system which maintains a selected intensity level. The circuit is composed of three operational amplifier stages. The first stage has a means for detecting the light intensity of the EL panel and providing a signal that is proportional to that intensity. The second stage has a means for comparing the light intensity level to a reference level that is proportional to the desired intensity level and, as a result of that comparison, provides a signal that is proportional to an intensity increase or decrease required to maintain the desired intensity or reference level. The third stage, responding to the output of the second stage, has a means for supplying and monitoring a voltage drive level to the panel inverter. In a preferred implementation the second stage also has a means for controlling light output pulsing.

Using a photo-feedback system, the present invention provides an absolute control of the intensity level from an EL panel-inverter lighting system. A result of this driving technique is an increased life span of the EL panel. Various other improvements and modifications of the present invention are explained in the detailed description below.

DETAILED DESCRIPTION OF THE INVENTION

Figure 1:
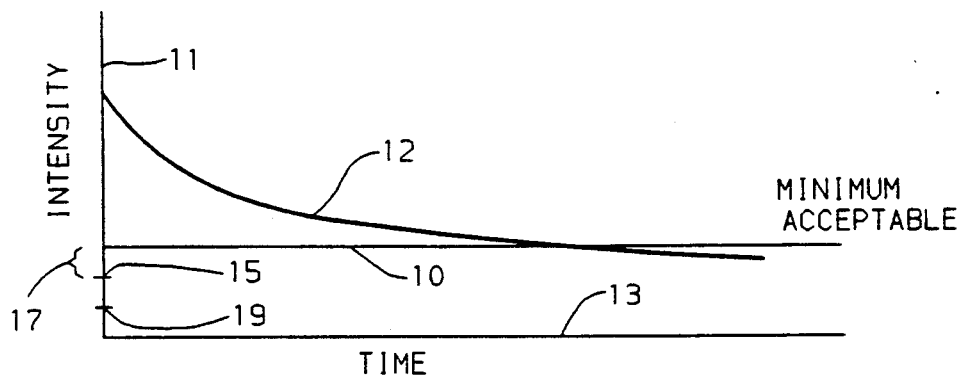
FIG. 1 is a graph illustrating the intensity output of an electroluminescent lamp over a period of time and a desired intensity level.

In FIG. 1, vertical axis 11 represents output light intensity and horizontal axis 13 represents operating time for an EL panel. Line 10 represents the minimum desired intensity for an electroluminescent lamp, e.g., the minimum brightness required of the lamp to be suitable in an automobile instrument panel. For the automobile instrument panel implementation to which this invention is aimed, the minimum intensity 10 must be at least as bright as the maximum brightness a vehicle operator would require. The vehicle operator can adjust the intensity down from there. Maximum intensity 12 shows the intensity that a typical lamp can produce. As can be seen, the maximum intensity 12 decreases over time. The suitable life of the electroluminescent lamp for automobile instrument panel use ends when the maximum intensity 12 falls below the minimum intensity 10.

The area of the graph between the maximum intensity 12 and the minimum intensity 10 represents unneeded intensity. The lighting system design must allow excessive intensity levels at the beginning of the panel aging curve to guarantee sufficient intensity at the end of the life of the panel. Operation at intensity levels above the minimum intensity 10 decreases the useful life span of the panel and accelerates the degradation of the panel. Utilizing the present invention, the EL panel can be driven so that its output intensity is constant, at the minimum level 10 or at another set level, increasing the life of the lamp.

Referring again to FIG. 1, the level 15 on the intensity axis 11 represents the desired lowest allowable intensity and level 19 represents the zero intensity for the lamp. The part of the intensity axis 11 indicated by the bracket 17 is the dimming range over which a vehicle operator is able to adjust the intensity level of the lamp. For automotive use, it is desirable for the EL panel driver to have the lowest allowable intensity level 15 set so that the lamp cannot be turned off. The implementation of the dimming range will be explained below along with why it is desirable to not allow the lamp to be turned off.

Figure 2:
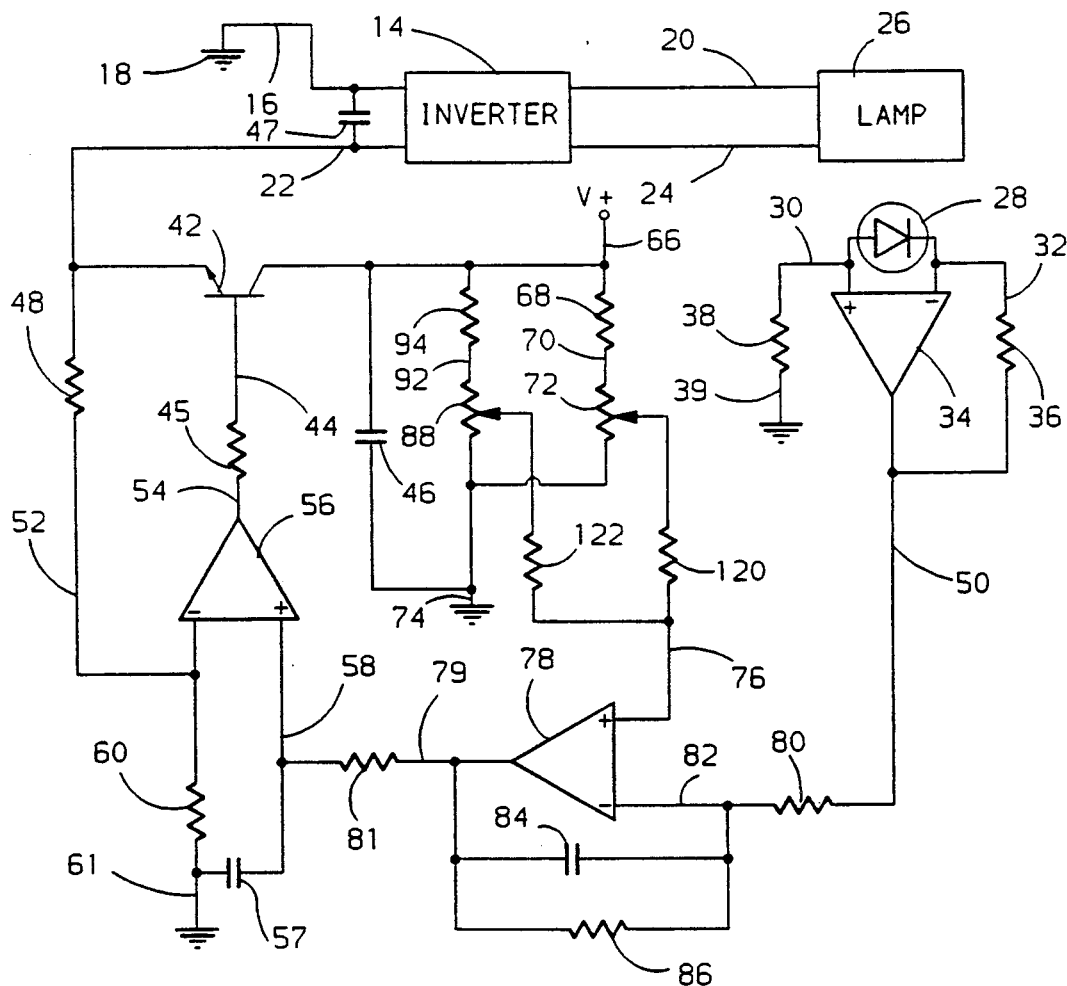
FIG. 2 is a circuit diagram of an electroluminescent lamp photo-feedback drive system.

The circuit in FIG. 2 will drive the lamp constantly at the minimum intensity 10, or if adjusted by an operator, below that intensity, for the life of the lamp. As a result, the life of the lamp is increased.

The inverter 14 powers the electroluminescent lamp 26 through lines 20 and 24. The electroluminescent lamp 26 illuminates in response to the power supplied by the inverter 14. Photo-diode 28, placed in proximity of the lamp 26 detects the light intensity of the lamp 26.

The photodiode is connected to the operational amplifier 34 through lines 30 and 32. Resistor 38 (5M) couples the operational amplifier 34 with ground 18 through lines 30 and 39. Resistor 36 (5M) provides a feedback from the operational amplifier 34 output to the inverting input at line 32. This first operational amplifier 34 acts as a current to voltage converter. As the intensity of lamp 26 increases, the current through the photo-diode 28 increases. As current through the photo-diode 28 increases, the voltage on line 50 increases. The voltage on line 50 is a pulsed signal since the lamp 26 puts out a pulsed light.

The signal on line 50 travels through resistor 80 (10K) to the inverting input of the second operational amplifier 78 through line 82. Capacitor 84 (1uF) and resistor 86 (1M), connected between the operational amplifier output at line 79 and the inverting input at line 82 act as an integrating circuit for the amplifier. This portion of the circuit integrates the signal output from the first operational amplifier and compares the signal to a reference signal on line 76. The reference signal on line 76 is provided by resistors 68 (50K), 94 (50K), 122 (10K), and 120 (10K) along with potentiometers 72 (10K) and 88 (5K). Resistor 68 and 94 are connected to V+ through line 66 and potentiometers 72 and 88 through lines 70 and 92 respectively. Potentiometers 72 and 88 are connected to ground 18 through line 74 as shown. The adjustable terminal of potentiometer 72 is connected to resistor 120 which is connected to line 76. The adjustable terminal of potentiometer 88 is connected to resistor 122 which is also connected to line 76. The reference signal is determined by adjusting the potentiometers 72 and 88.

Potentiometer 88 controls the minimum possible intensity of the lamp. As will be explained below, it is desirable to set the minimum intensity of the lamp so that the lamp cannot be turned off by an operator. To properly set potentiometer 88, potentiometer 72 is first adjusted so that the intensity of the lamp is as low as possible through adjustment of potentiometer 72. Potentiometer 88 is then adjusted so that the EL lamp 26 is on at the lowest desired intensity level. Potentiometer 88 is then placed so that it is not accessible by an operator. Potentiometer 72 can then be adjusted by an operator to control the intensity of the lamp, with the lower limit on intensity controlled by potentiometer 88. The upper limit on the intensity of the EL lamp 26 is a function of resistor 68 and potentiometer 72.

Figure 4:
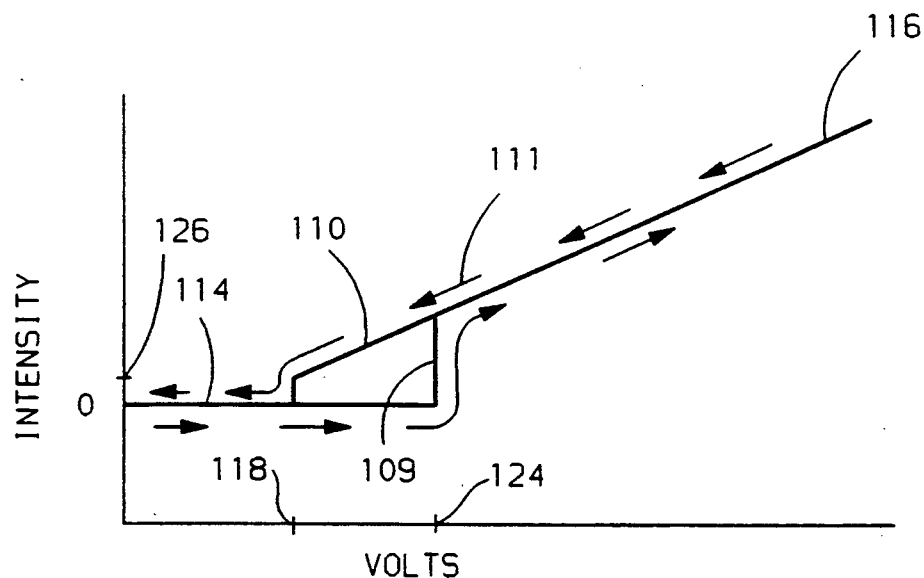
FIG. 4 is a graph showing the hysteresis characteristics during turn on and turn off of an electroluminescent lamp.

FIG. 4 illustrates why it is favorable to prevent the lamp 26 from being turned off. Line 114 shows that as voltage across the lamp increases, the light intensity of the lamp remains zero until a threshold voltage is reached. Line 109 shows that, at the threshold voltage level 124, the lamp will switch on and emit light. Line 116 shows that intensity of the lamp increases with voltage, after the threshold voltage is reached. Line 110 shows that as the voltage is decreased, the intensity of the lamp decreases as low as intensity level 126, with a switch off voltage level 118 lower than the switch on voltage. The arrows 111 show the direction of increasing and decreasing voltages.

Because electroluminescent lamps have switch on and switch off voltages instead of complete linearity, the lamps tend to flicker when voltages near the threshold points are applied. This flicker is caused by fluctuations in the driving voltage. To prevent the lamp from flickering, the signal provided by potentiometer 88 is set so that the voltage on line 76 is always high enough to prevent the lamp from being turned off.

The output of the second operational amplifier 78 is a function of the difference between the voltages on lines 50 and 76. The greater the voltage on line 50, the less the voltage on line 79, the output of the second operational amplifier. Also, the greater the voltage on line 76, the greater the voltage on line 79.

By adjusting the potentiometer 72, the lamp becomes brighter or dimmer as the difference between the two inputs of the amplifier 78 increases and decreases. Amplifier 78 also compensates for the aging of lamp 26. As the lamp ages, it decreases light intensity output per voltage applied. If the intensity of the lamp decreases, the voltage on line 50 decreases. When this occurs, the difference between the two inputs of amplifier 78 increases, so the output of the amplifier increases, which brightens the lamp, as described below, to compensate for aging.

The output signal of the second operational amplifier is coupled to the third operational amplifier 56 at line 58 through resistor 81 (100K). Capacitor 57 (1uF) is connected between line 58 and ground to filter out noise in the signal on line 58. The third operational amplifier 56 is connected in a feedback control loop to control power transistor 42. Line 54, the output of the operational amplifier 56 is coupled to the base of the transistor 42 through resistor 45 (39K) and line 44.

The collector of power transistor 42 is connected to the V+ voltage supply and the emitter is connected to line 22 and to resistor 48 (100K). Resistor 48 is connected to line 52, which is connected to the inverting input of operational amplifier 56 and to resistor 60 (50K), which is grounded through line 61. Resistors 48 and 60 act as a voltage divider which provides feedback to the operational amplifier 56. The feedback loop not only provides a means of controlling the drive signal in line 22, but also lowers the level of capacitively coupled noise in the supply lines.

Figure 3:
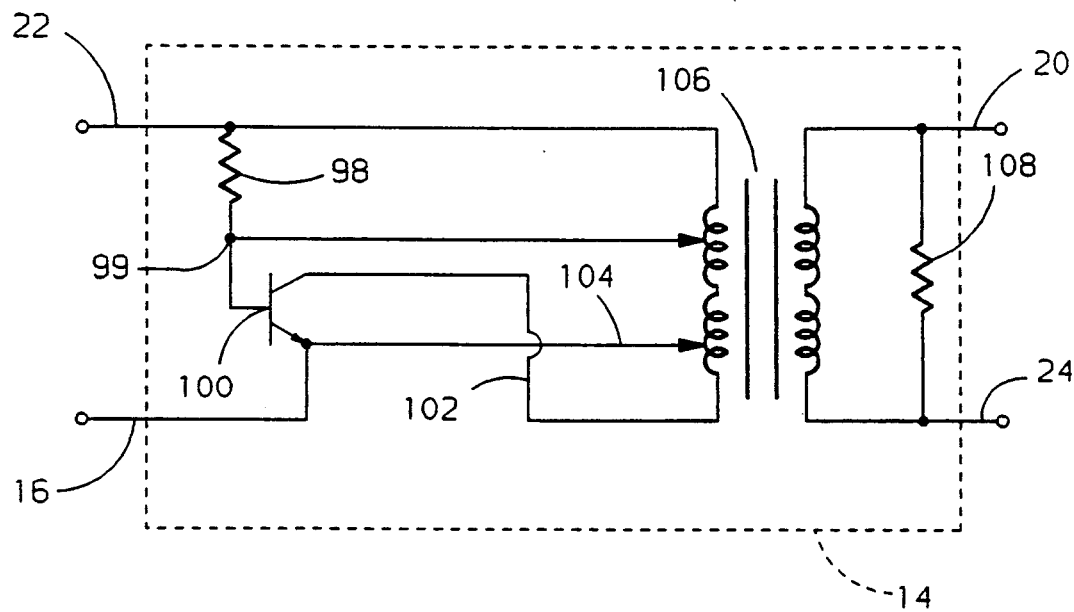
FIG. 3 is a circuit diagram of the inverter in FIG. 2.

Capacitors 46 (1uF) and 47 (2200uF) help filter noise out of the power supply and help insulate the power supply line 66 from noise created by voltage spikes from the inverter transformer 106 (FIG. 3).

The signal on line 22, the output of the power transistor 42, is the drive signal for the inverter 14. The operational amplifier 56 controls the signal on line 22. As the voltage on line 58 increases, the voltage on line 54 increases. As the voltage on line 54 increases, the voltage on line 22, which controls the intensity of the electroluminescent lamp 26, increases.

The inverter 14 is grounded through line 16. FIG. 3 shows the circuit of the inverter. Line 22 is connected to one end of transformer 106 and to resistor 98. The other end of resistor 98 is connected to line 99 which is connected to a first tap of the input side of transformer 106 and to the base of transistor 100. The emitter of transistor 100 is connected to line 16, and to a second tap of transformer 106 through line 104 as shown. The collector of transistor 100 is connected to the second end of the input side of transformer 106. The output of the transformer 106 is connected to resistor 108 as shown and to lines 20 and 24, which provide high voltage power to the electroluminescent lamp 26 (FIG. 2).

The transformer 106, resistor 108, and electroluminescent lamp 26 (FIG. 2), form an RLC circuit. The frequency of the inverter will naturally tend towards the resonant frequency of the above RLC circuit. The functioning of the inverter circuit can be easily understood by one skilled in the art and will not be explained in further detail here.

The above described circuit drives an electroluminescent lamp at a constant intensity throughout the lifetime of the lamp. Although the lamp intensity is adjustable by an operator, it does not fade as the lamp ages through the useful life of the lamp. The circuit is ideal to power electroluminescent lamps in automobile and aircraft instrumentation panels.

While described with reference to the illustrated embodiment, the invention does not need to appear as in the above circuit. The values for circuit elements given are not meant to be limiting but just one example of how the invention can be implemented into a circuit to provide an improved electroluminescent lamp driver. Moreover various other modifications will occur to those skilled in the art, and systems incorporating those modifications may fall within the scope of this invention which is defined in the claims below.

The embodiments of the invention in which an exclusive property or privilege is claimed are defined as follows:

1. A circuit for providing power to an electroluminescent lamp having an output light intensity controlled by a drive signal from a drive source, said output light intensity decreasing over a period of time when said lamp is driven at a constant voltage, comprising:

means for detecting the light intensity of the lamp and providing a light intensity signal responsive to said light intensity;

first comparison means for comparing the light intensity signal to a first reference signal and providing a first comparing output signal responsive to said first comparison;

second comparison means for comparing the first comparing output signal to a second reference signal indicative of the drive signal and providing a second comparing output signal in response to said second comparison;

means for providing the drive signal in response to the second comparing output signal;

a driver driving the electroluminescent lamp in response to the drive signal, whereby the electroluminescent lamp is driven at a constant intensity;

a first potentiometer coupled between a voltage supply and ground, with a first adjustable terminal of the first potentiometer coupled to the first comparison means, wherein adjustment of the first potentiometer affects an adjustment of the first reference signal; and a second potentiometer coupled between the voltage supply and ground, with a second adjustable terminal of the second potentiometer coupled to the first comparison means in a parallel circuit with the first adjustable terminal of the first potentiometer, wherein adjustment of the second potentiometer also affects an adjustment of the first reference signal, whereby the first potentiometer is adjusted to restrict lamp intensity above a desired minimum intensity and the second potentiometer is adjustable by an operator to control the lamp intensity, which is restricted above the desired minimum by the first potentiometer.

* * * * *